(12) United States Patent
Del Callar et al.

(10) Patent No.: US 7,792,746 B2
(45) Date of Patent: Sep. 7, 2010

(54) METHOD AND SYSTEM FOR MATCHING REMITTANCES TO TRANSACTIONS BASED ON WEIGHTED SCORING AND FUZZY LOGIC

(75) Inventors: Joseph L. Del Callar, San Ramon, CA (US); Muthu Senthil, Mountain View, CA (US); Alan Fothergill, Half Moon Bay, CA (US); Tapomoy Dey, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1410 days.

(21) Appl. No.: 10/627,027

(22) Filed: Jul. 25, 2003

(65) Prior Publication Data

US 2009/0094154 A1    Apr. 9, 2009

(51) Int. Cl.
*G06Q 40/00* (2006.01)
(52) U.S. Cl. .......................................... 705/39; 705/35
(58) Field of Classification Search .............. 705/35–45
See application file for complete search history.

(56) References Cited

U.S. PATENT DOCUMENTS

| | | | |
|---|---|---|---|
| 5,679,940 A * | 10/1997 | Templeton et al. | 235/380 |
| 5,724,597 A * | 3/1998 | Cuthbertson et al. | 715/201 |
| 6,240,409 B1 * | 5/2001 | Aiken | 707/4 |
| 6,424,951 B1 * | 7/2002 | Shurling et al. | 705/14 |
| 6,742,124 B1 * | 5/2004 | Kilpatrick et al. | 726/23 |
| 6,973,663 B1 * | 12/2005 | Brown et al. | 725/39 |
| 2001/0051899 A1 * | 12/2001 | Kawashima et al. | 705/26 |
| 2002/0103793 A1 * | 8/2002 | Koller et al. | 707/3 |
| 2002/0107794 A1 * | 8/2002 | Furphy et al. | 705/40 |
| 2002/0194096 A1 * | 12/2002 | Falcone et al. | 705/35 |
| 2003/0065595 A1 * | 4/2003 | Anglum | 705/35 |
| 2003/0158111 A1 * | 8/2003 | Bar-Or | 514/12 |
| 2003/0212654 A1 * | 11/2003 | Harper et al. | 707/1 |
| 2003/0220858 A1 * | 11/2003 | Lam et al. | 705/35 |
| 2004/0054685 A1 * | 3/2004 | Rahn et al. | 707/102 |
| 2004/0056485 A1 * | 3/2004 | Love et al. | 285/363 |
| 2004/0064375 A1 * | 4/2004 | Randell et al. | 705/26 |
| 2004/0073510 A1 * | 4/2004 | Logan | 705/40 |
| 2004/0208907 A1 * | 10/2004 | Hey et al. | 424/405 |
| 2008/0052230 A1 * | 2/2008 | Crane et al. | 705/40 |

* cited by examiner

*Primary Examiner*—Jagdish N Patel
*Assistant Examiner*—Kevin Poe
(74) *Attorney, Agent, or Firm*—Townsend and Townsend and Crew LLP

(57) ABSTRACT

A method for matching remittances to transactions is disclosed. The method for matching remittances to transactions uses a processing paradigm based on weighted scoring and fuzzy logic that is easy to maintain and fosters the use of logic based on the summarization of payments. The system and method also matches remittances to particular transactions with relaxed sensitivity to where identifying markers may be placed on a remittance and is resistant to typographical data entry errors. Further, the system and method is flexible with regards to handling various kinds of information that can result in accurate, precise matching without discarding or overlooking such information.

25 Claims, 12 Drawing Sheets

METHOD AND SYSTEM FOR MATCHING REMITTANCES TO TRANSACTIONS BASED ON WEIGHTED SCORING AND FUZZY LOGIC

FIELD OF THE INVENTION

Embodiments of the present invention relate to the field of business technology. Specifically, embodiments of the present invention relate to a method and systems for matching remittances to transactions based on weighted scoring and fuzzy logic.

BACKGROUND OF THE INVENTION

Companies and other entities that deploy and use computer financials applications use services to process payments from their own customers. These services are commonly known as lockbox services. Lockbox services allow business entities to take advantage of economies of scale available at financial institutions such as banks. The business entity takes advantage of these economies of scale by consolidating their payment processing with that of the financial institution's other clients.

Some conventional lockbox technologies use a row-by-row (e.g., payment line-by-payment line) processing paradigm. However, a row-by-row processing paradigm can be difficult to maintain. Further, logic based on the summarization of payments can be difficult to implement with this conventional method. However, financials applications developers may for example, want to create trade deductions for a given invoice based on the final sum of all payment lines for the invoice, which could be troublesome to implement conventionally.

Typically, most lockbox files are created by human data-entry clerks. Thus, lockbox files are prone to typographical and other related errors. One significant limitation of lockbox solutions in general is the incapability of the lockbox solutions to handle user error. Also, to participate in lockbox remittance handling, a business entity typically may request that its customers mark their remittances with a unique identifier or another identifying feature, such as an identifying number or other such marker. Sometimes, the marker is be placed in a particular location on the remittance.

How customers respond to a billing entity's request for marking their remittances with an identifying number depends on several factors. One such factor is that customers cooperatively respond to the entity's request. Where customers willingly provide the requested identifying marker, other issues can arise that may hamper the lockbox remittance handling efforts. For instance, the marker may not be placed in the requested or most ideal location: customers may place the identifier based on their own whims and judgment, which can be error prone.

In order to utilize and bolster their lockbox remittance handling efforts, business entities and business financials applications developers have engaged in on-going efforts to work around these issues. Conventional efforts to correctly (e.g., accurately and precisely) match a remittance to the transaction it is intended to pay have generally aimed at attempting to render an exact match between the identifying number provided by the customer to a variety of the possible identifying numbers or other identifiers associated with a transaction.

Conventionally, the amount of a payment and the identity of the customer remitting it are also typically taken into consideration when matching the remittance to a transaction. In conventional approaches to correctly match a remittance to the transaction it is intended to pay, users also typically have to provide an order of significance of the types of identifying numbers to be matched. For instance, one exemplary possible user selected hierarchy can be to match against invoice numbers first; if that fails, match against sales order numbers, and so on.

These conventional workarounds however require precise entry of the identifying information, which as discussed above is prone to error. Conventional techniques also tend to discard possible matches because of inflexibility inherent in the selection of ordering hierarchy, such as what types identification numbers are tried. For instance, customers may sometimes remit amounts other than the invoiced amount. Thus, inflexible conventional techniques may discard matches because the payment amounts are not equal to the amount due remaining on the transaction.

The inability to accurately and precisely match a remittance with its correct corresponding transaction can be costly. A business entity may forestall applying the remittances until the correct match is made. Delay in applying the remittances can result in concomitant delay in availability of funds. Where a match is not returned on the basis of information supplied with the remittance, direct human intervention can be required in the form of research conducted, which can be painstaking, in order to match the remittance and transaction. Costs of such research can be significant.

Thus, conventional approaches matching remittances to transactions that are undertaken by business entities can be inadequate. Their processing paradigm can be difficult to maintain and can deter use of logic based on the summarization of payments. They are prone error. Identifiers used to match remittances to particular transactions may be misplaced by customers and then overlooked by the receiving entity. Conventional workarounds are constrained by inflexibility, such that they discard or overlook information that can result in proper matches between the remittance and the transactions to which they should be matched.

SUMMARY OF THE INVENTION

A method is needed that can match remittances to transactions that uses a processing paradigm that is not complicated to maintain and fosters the use of logic based on the summarization of payments. A system and/or method is also needed that can match remittances to particular transactions with relaxed sensitivity to where identifying markers are placed on a remittance and that is resistant to typographical data entry errors. Further, a system and/or method is needed that can match remittances to transactions that is flexible with regards to handling various kinds of information that can result in accurate, precise matching without discarding or overlooking such information.

A method for matching remittances to transactions is disclosed. The method for matching remittances to transactions disclosed herein uses a processing paradigm that is easy to maintain and fosters the use of logic based on the summarization of payments. The method disclosed herein also matches remittances to particular transactions with relaxed sensitivity to where identifying markers may be placed on a remittance and is resistant to typographical data entry errors. Further, the method disclosed herein is flexible with regard to handling various kinds of information that can result in accurate, precise matching without discarding or overlooking such information.

Computing power is currently available to business entities that can process large, even massive amounts of data in a cost-effective manner. Business entities currently have access to computers that have gigabytes of main memory at reasonable prices. Such low cost, high power and capacity computing resources allow implementation of computing paradigms such as those which can effectuate practical computation with imprecise data and on problems with non-unitary solutions. One such computing paradigm utilizes fuzzy logic.

One embodiment of the present invention implements a novel approach to lockbox remittance-to-transaction matching. The present embodiment takes advantage of the aforementioned currently available computing capacity to load all pertinent matching information into computer memory and process the information in memory using a fuzzy logic matching process that can compensate for inaccuracies in the data. In one embodiment, issues related to discarding possible matches due to the strict hierarchical order of identification numbers or the mismatch of the payment amount are solved by evaluating a substantial majority of possible matches.

In one embodiment, this evaluation proceeds using weights specified by the user. This evaluation provides a substantially comprehensive picture of effectively all possible matching invoices. Further, this evaluation prevents a possible match from being removed from consideration by an unfavorable hierarchy of identification numbers or an unfair weighting of the payment amount.

In one embodiment, a computer implemented method matches a remittance to a transaction by receiving remittance lines, transaction information, and matching rules wherein the matching rules assign a weight to a parameter considered in the matching, computing a weighted matching score corresponding to the parameter based upon that weight wherein the matching score corresponds to a probability of an accurate and precise match between the remittance and the transaction, and generating a match recommendation based on that weighted matching score.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
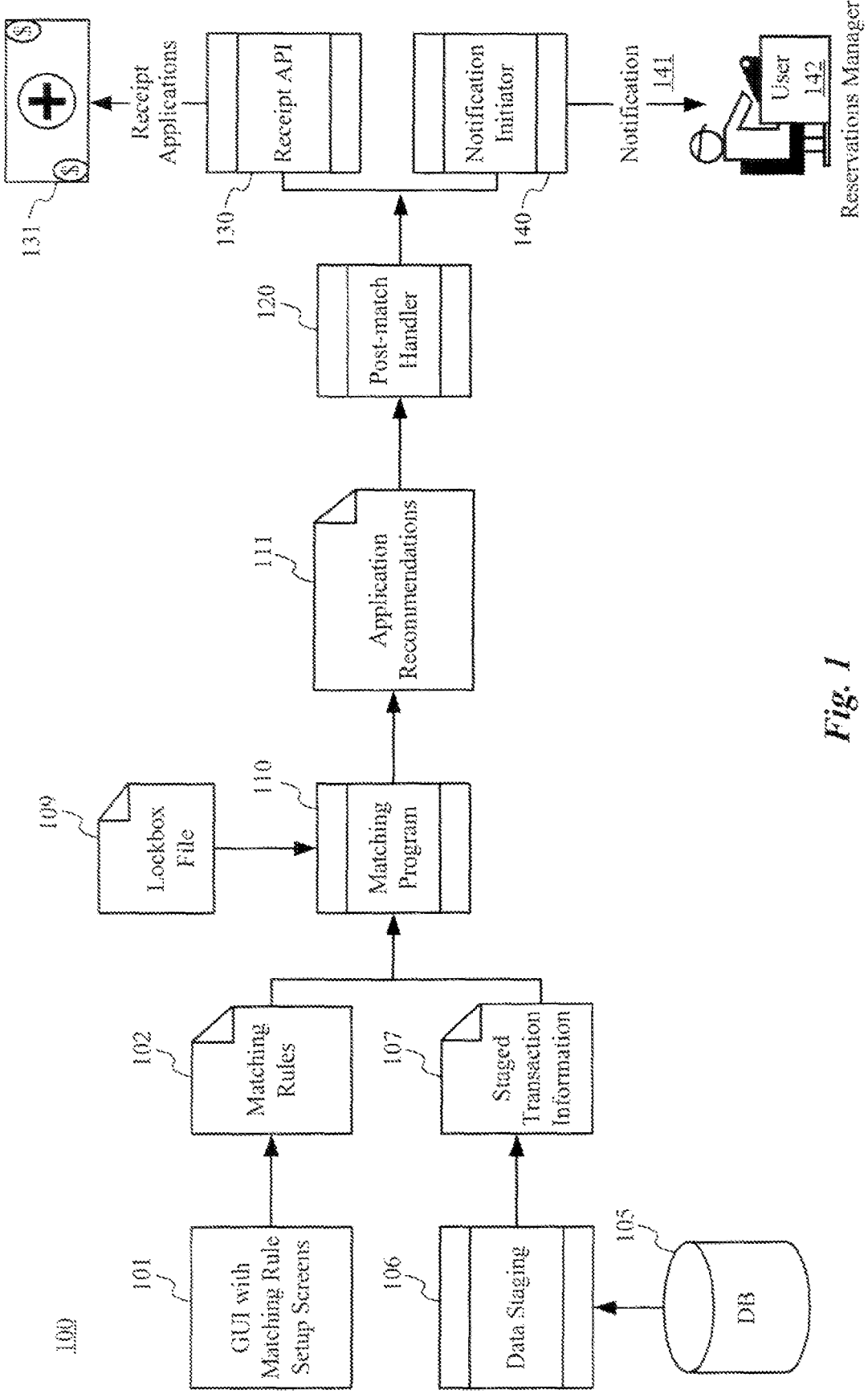
FIG. 1 depicts a system for matching remittances based on weighted scoring and fuzzy logic and flow there through, according to one embodiment of the present invention.

A system and method for matching remittances based on weighted scoring and fuzzy logic is disclosed. Reference will now be made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, one of ordinary skill in the art will realize that embodiments of the present invention may be practiced without these specific details. In other instances, well-known methods, processes, algorithms, procedures, networks, systems, components, and circuits have not been described in detail so as not to unnecessarily obscure aspects of the present invention.

A computer system that embodies a system and performs a method for matching remittances to transactions can comprise any kind of computer system with sufficient computing power and memory capacity. For example, the computer system can comprise a workstation computer system, a personal computer system, a specialized business and financial computing system, a main-frame computer system, or a super-computer system. Modules of the system for matching remittances to transactions can be implemented in software, firmware, and/or hardware or any combination of software, firmware, and/or hardware.

Portions of the detailed descriptions of embodiments of the invention that follow are presented and discussed in terms of processes. Although specific steps and sequence thereof are disclosed in figures herein (e.g., FIG. 2, FIG. 5) describing the operations of these processes (e.g., processes 200, 500), such steps and sequence are exemplary. Embodiments of the present invention are well suited to performing various other steps or variations of the steps recited in the flowcharts of the figures herein, and in another sequence than the sequence depicted and described.

In one embodiment, such processes are carried out by processors and electrical/electronic components under the control of computer readable and computer executable instructions comprising code contained in a computer usable medium. In one embodiment, a graphical user interface (GUI) is also effectuated by such processors and components under the control of computer readable and computer executable instructions. The computer readable and computer executable instructions reside, for example, in code within a computer usable medium and used in the processor, data storage features, memory, registers and other components of a computer system performing the method for matching remittances to transactions. However, the computer readable and computer executable instructions may reside in any type of computer readable medium.

One embodiment of the present invention provides significant reduction in miss rate (e.g., failing to accurately and precisely match a remittance to a correct, corresponding transaction). Advantageously, use of the present embodiment by a business entity can provide a business entity user with a significant savings in what must conventionally be expended on research costs associated with unapplied receipts (e.g., research conducted by trained personnel to correlate unmatched/mismatched receipts to their correct corresponding transactions). Further financial advantages can accrue to the concomitant ability to more quickly apply remittances received, once they are matched to their respective transactions.

Exemplary System for Matching Receipts

FIG. 1 depicts a computer-based system 100 for matching remittances based on weighted scoring and fuzzy logic and flow there through, according to one embodiment of the present invention. A graphical user interface (GUI) provides a plurality of matching rules setup screens 101 that allow a scoring model to be programmed. The computer controlled by the setup screens 101 provided by its GUI outputs a set of matching rules 102. Matching rules 102 specify the scoring model programmed by interactive setup screens 101 that stipulate the weight (e.g., relative scoring significance) that a variety of conditions and attributes will hold individually and with respect to each other.

A data staging program 106 stages data such as receivables data retrieved from a database 105. The receivables data comprises information that is relevant to matching remittances to corresponding transactions, based on weighted scoring and fuzzy logic. Data staging program 106 provides the information 107 that it stages to a matching program 110.

Matching program 110 receives matching rules 102 from setup screens 101 and the staged transaction information 107 from data staging program 107. Further, matching program 110 receives data from lockbox file 109. Matching program 110 then matches transactions to remittance lines to match remittances to the transactions. In one embodiment, matching program 110 uses weighted scoring according to rules 102 and applies fuzzy logic to effectuate the matching. Upon computing matches for remittance lines to their respective transactions, matching program 110 provides application recommendations 111 to a post-match handler 120.

Upon receiving application recommendations 111, post match handler (applier) 120 calls a receipts application program interface (API) 130 of an applications database to create corresponding receipts and apply matched remittances to appropriate transactions. In the event of unmatched remittances, post-match applier 120 calls a notification initiator 140 to handle them.

Receipt API 130 assigns an informative header to a receipt for use by a receipt application 131. Where the remittance line corresponding thereto in lockbox file 109 matches more than one customer (e.g., remitter), receipt API 130 assigns an appropriate receipt header to receipts.

Notification initiator 140 initiates a workflow notification 141 to a user entity 142 where matching program 110 does not determine a match for a remittance to a transaction.

Exemplary Process for Generating Match Recommendations

Figure 2:
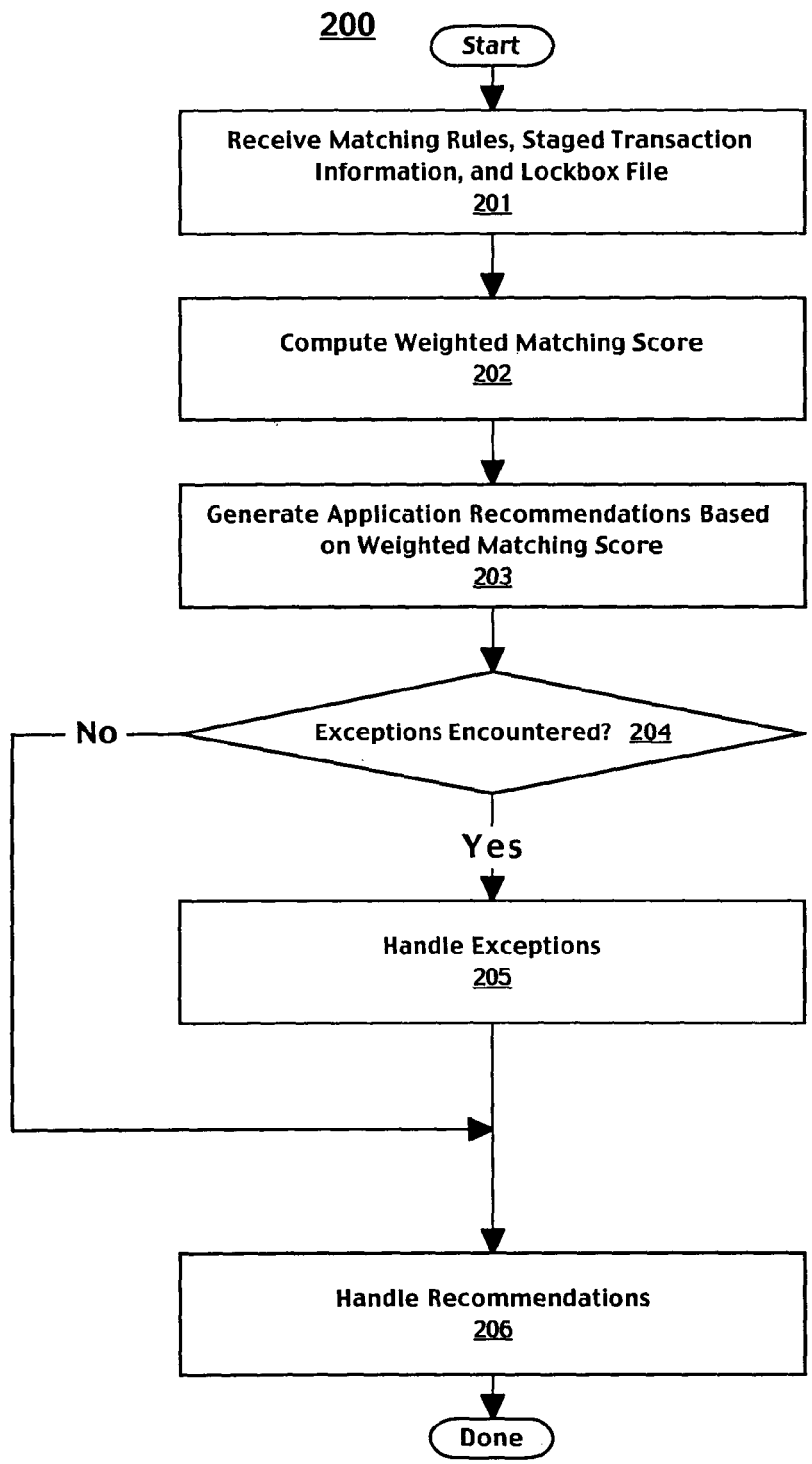
FIG. 2 is a flowchart of an exemplary process for generating matching recommendations, according to one embodiment of the present invention.

FIG. 2 is an exemplary flowchart of a computer-based process 200 wherein a matching program (e.g., matching program 110; FIG. 1) generates matching recommendations, according to one embodiment of the present invention. Process 200 begins with step 201, wherein the matching program receives matching rules, transaction information, and information from a lockbox file (e.g., matching rules 102, staged transaction information 107, lockbox file 109; FIG. 1).

Figure 5:
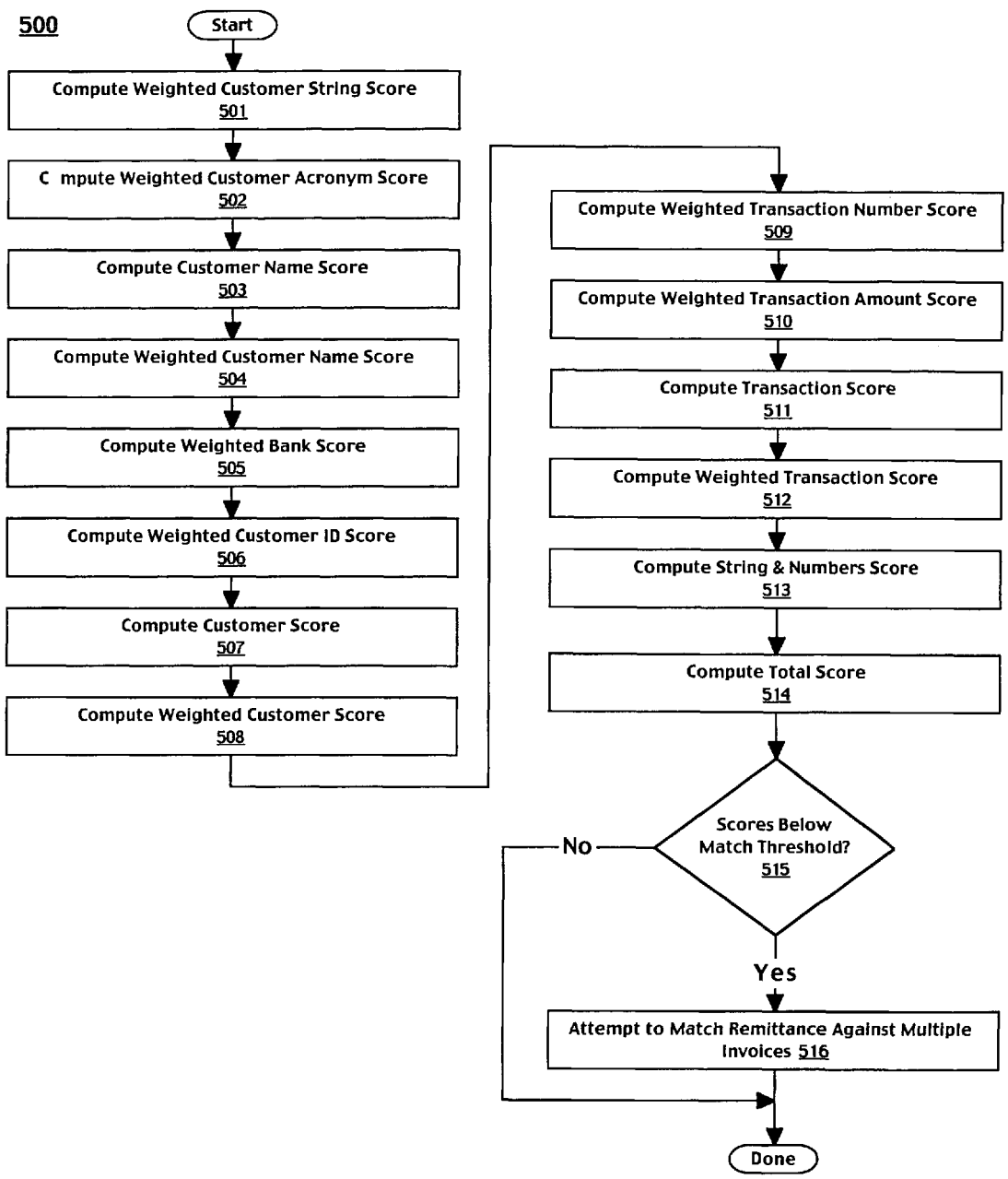
FIG. 5 is a flowchart of an exemplary process wherein weighted scores are computed, according to one embodiment of the present invention.

In step 202 of FIG. 2, the matching program computes a weighted matching score for a remittance to a transaction. The matching program can compute the weighted matching score in several ways. In one embodiment, the matching program computes the weighted matching score by a process in which scores are computed over a number of parameters, each of which is weighted, strings comprising the multiplicity of weighted scores over the parameters are scored and combined, and a total score computed therefrom. One such process (e.g., process 500; FIG. 5) is discussed below.

In step 203, the matching program generates application recommendations of possible matches for use by a post match handler (e.g., post-match handler 120; FIG. 1). The recommendations may be based on the weighted matching score calculated, e.g., the higher the weighted score, the more probable it is that a particular remittance matches (e.g., corresponds to) a particular transaction.

In step 204, it is determined whether exceptions are encountered, such as scores falling below a match threshold. If it is determined that exceptions are encountered, then in step 205, the exceptions are handled.

In one embodiment, exceptions are handled by attempting to match a remittance against multiple transaction invoices. In one embodiment, matching the remittance against multiple transaction invoices is performed using a process employing a heuristic such as a Knapsack Heuristic, wherein the sum of the invoices is matched as closely as possible to the amount of the remittance.

Upon handling the exceptions (or if no exception is encountered), in step 206, the applications are handled, upon which process 200 is complete. In one embodiment, a post-match handler calls a receipt API with the matches and a notification initiator if no matches are found (e.g., post-match handler 120, receipt API 130, notification initiator 140; FIG. 1).

In performing process 200, according to one embodiment, the matching program takes the given lockbox file (e.g., lockbox file 109) and attempts to match the remittance lines contained therein to the data on transactions extracted by the data staging program (e.g., staged transaction information 107, data staging program 106; FIG. 1). In order to find the best match for a given remittance, all transactions selected by the staging program may first be scored.

The transaction with the best score is then selected and compared to a global match threshold defined by the user during set up in one example. If the score is equal to or above the given threshold, then the match is considered valid and is passed on to the receipt application program for processing. If the score is below the given threshold, the match is not considered valid.

Transmission Format definitions currently available in, for example a receivables application, are leveraged in one embodiment to control the manner in which the lockbox file is read from the file system. For instance, a user specifies the location and name of the lockbox file in a lockbox file parameter, and the format of the file using the transmission format parameter. In order to minimize memory use, in one embodiment the matching program (e.g., matching routine) first spawns a program to read the cognizant transmission format specifications from a database to a format specification file. This format specification file will then be used by the main matching program to read the lockbox file.

The lockbox transmission format specification file outlines to the main matching routine how to read the given lockbox file. Internal lockbox record entries store payment information for use during the matching and application phases. The fields in the lockbox record should correspond to fields defined in a transmission formats window. Table 1 below lists exemplary transmission format fields included in the lockbox record of one embodiment. It is appreciated that the fields in Table 1 below are exemplary; some of these fields may be omitted and/or other fields may be included in the lockbox record, in another embodiment.

TABLE 1

Account: the payer's bank account. The bank account number and the transit routing number make up the payer's magnetic ink character recognition (MICR) number.
Amount Applied 1 to 8: The amount applied to each invoice, debit memo, or chargeback in the transaction currency. Each payment or overflow payment record can accommodate up to eight debit item numbers in one example. For cross currency applications, this can be the amount to apply in the transaction currency and corresponds to the Amount Applied field in the Applications window.
Bank Transaction Code: A code defined for each account that is used by the bank to uniquely identify the kind of transaction in a bank statement (for example, debit, credit, void). This is also used by a cash management application or similar application to determine a receipt's effective date.
Customer Bank Branch Name: The name of the customer's bank branch.
Customer Bank Name: The name of the customer's bank.
Customer Number: The identification number of the customer who submitted a payment.
Deposit Date: The date the bank receives and deposits the customer's payment.
Effective Date: The date on which the bank determines a customer's balance to apply interest (used by a cash management application's forecasting feature).
Invoice 1 to 8: The invoices, debit memos, and chargebacks to which a business entity applies the payment. Each payment or overflow payment record can accommodate up to eight debit item numbers.
Invoice 1 to 8 Installment: The installment number for this invoice.
Lockbox Number: The identification number for a specific lockbox.
Payment Method: The payment method associated to this lockbox.
Payment Number: The identification number of a payment. For example, a check number.
Receipt Date: The date the customer made a payment.
Record Identifier: A number that identifies the kind of transmission record (e.g., Overflow Payment, Payment, Lockbox Header, etc.).
Remittance Amount: The amount of the payment.
Transit Routing Number: The number that uniquely identifies the payer's bank. The transit routing number and the customer bank account number make up the payer's MICR number.

In one embodiment, the following lockbox record fields are used by the Matching Program to identify matches:
 Account Number (in conjunction with the Transit Routing Number);
 Amount Applied 1 to 8;
 Customer Number;
 Invoice 1 to 8;
 Invoice 1 to 8 Installment;
 Payment Number;
 Transit Routing Number (in conjunction with the Account Number).
In one embodiment, the following fields are used when the actual applications are made:
 Bank Transaction Code;
 Customer Bank Branch Name;
 Customer Bank Name;
 Deposit Date;
 Effective Date;
 Lockbox Number;
 Payment Method;
 Receipt Date.

The matching routine reads these fields in to communicate them along with the applications it recommends to the application routine.

In one embodiment, cross-currency applications are not considered. In the present embodiment therefore, the following field types (available for cross-currency applications) are not included in the lockbox record. The routine logs an error and exits immediately if any are encountered in the lockbox file:
 Amount Applied From;
 Currency Code;
 Exchange Rate;
 Exchange Rate Type;
 Invoice Currency Code;
 Trans to Receipt Rate.

In another embodiment supporting cross-currency applications, such field types can be considered. In one embodiment, flexfields and all other fields not mentioned herein are not be included in the lockbox record; they are not required to match the remittance or apply it to a transaction and are effectively ignored by the matching program.

A format specification file that can be written by the matching routine has a format that can be illustrated by the exemplary lines below in Table 2.

TABLE 2

Exemplary Code Format

```
<transRecord recordtype="[Transmission Format Record
Type 1]
        identifier="[transmission record
identifier 1]">
    <field type="[field 1 type]"
        start="[start position 1]"
        end="[end position 1]"
        justification="[justification 1]"
        pad="[pad character 1]">
    <field type="[field 1 type]"
        start="[start position 2]"
        end="[end position 2]
        justification="[justification 2]"
        pad="[pad character 2]">
    ...
    <field type="[last field type]"
        start="[last start position]"
        end="[last high char position]"
        justification="[last justification]"
        pad="[last pad character]">
</transRecord>
<transRecord recordtype="[Transmission Format Record
Type 2]
        identifier="[transmission record
identifier 2]">
    ...
</transRecord>
...
<transRecord recordtype="[last Transmission Format
Record Type]
        identifier="[last transmission record
identifier]">
    ...
</transRecord>
```

Each transRecord entry corresponds to a Transmission Record entry of the Transmission Format specified by the user. Each of the field entries corresponds to the Transmission Field entries that belong to the Transmission Record. The type attributes of the field records correspond to the value of the Field Type of the specified Transmission Field. The start and end attributes of the field records correspond to the matching start and end positions, respectively, for the given Transmission Field. An Extensible Markup Language (XML) schema definition for the file format is illustrated by the exemplary lines below of Table 3.

TABLE 3

Exemplary XML Schema Definition for File Format

```
<xsd:element name="transRecord"
    type="transRecordType"/>
<xsd:complexType name="transRecordType">
    <xsd:sequence>
        <xsd:element name="field" type="fieldTYpe"
            minOccurs="1" maxOccurs="unbounded">
    </xsd:sequence>
    <xsd:attribute name="recordtype"
    type="xsd:NMTOKEN"/>
        <xsd:attribute name="identifier"
    type="xsd:NMTOKEN"/>
</xsd:complexType>
<xsd:complexType name="fieldType">
    <xsd:attribute name="type" type="xsd:NMTOKEN"/>
    <xsd:attribute name="start" type="xsd:decimal"/>
    <xsd:attribute name="end" type="xsd:decimal"/>
    <xsd:attribute name="justification"
    type="xsd:NMTOKEN"/>
        <xsd:attribute name="pad" type="xsd:NMTOKEN"/>
</xsd:complexType>.
```

The lockbox reading routine takes the format specification file and use it to read the lockbox file specified by the user. The routine reads the lockbox file line-by-line. Each transmission line in the lockbox file ends with a carriage return and/or linefeed, and begins with a recognized transmission record identifier for the transmission format specified by the user.

The program validates that none of the fields within a transRecord rule have a start and end position that does not overlap with another field's. The transmission record identifier at the beginning of a lockbox line specifies the transRecord rule to be used for reading the line. As discussed above, the transmission record identifier is at the beginning of the line. Although the program should expect the transmission record identifier at the beginning of a lockbox line, the transmission format file specifies, in one embodiment explicitly, the start and end position of the transmission record identifier, as it may be 1 or 2 characters in length.

In one embodiment, the matching program looks at the start and end positions for each field specified and loads the corresponding lockbox record field. Before loading a data entry in the lockbox file into the lockbox record, the string must first be stripped of padding characters. The justification and pad attributes of the transmission format specification that corresponds to the field determines how the pad characters should be truncated are described in Table 4, below.

TABLE 4

| Pad Attribute Value | Justification Attribute Value | Truncation Action |
|---|---|---|
| Zero | Left | Remove all zeros (0) after last non-zero character in the string. |
|  | Right | Remove all zeros (0) before the first non-zero character in the string. |
| Blank | Left | Remove all whitespace after the last non-whitespace character in the string, excluding carriage returns & linefeeds. |
|  | Right | Remove all whitespace after the first non-whitespace character in the string, excluding carriage returns & linefeeds. |

Multiple entry fields such as Invoice 1 through 8, Invoice Installment 1 through 8, and Amount Applied 1 through 8 each correspond to a different lockbox record entry from the point of view of the matching program and are loaded as independent records.

Each of the payment entries in the file will not necessarily have all of the fields required to completely fill in a lockbox record. For example, lockbox files can typically contain several overflow payment lines after a payment line, but the customer information for the payment will only appear on the payment line. In order to complete the lockbox record entry, the following records are searched, to fill in missing field values:

the associated Transaction entry before the next Transaction;
the associated Overflow Payment line;
the associated Payment line;
the associated Batch Header line;
the associated Lockbox Header line;
the associated Service Header line;
the associated Transmission Header line.

In one embodiment, these records are searched in the order specified above.

If none of these lines contain currency information, then the default functional currency is used. If any date value is missing, the current system date is substituted. If any other value is missing, then the process continues with no value in the corresponding field in the record. For example, one transRecord format specification is illustrated by the exemplary lines below in Table 5.

TABLE 5

Exemplary transRecord Format Specification

```
<transRecord recordtype="Payment"
        identifier="5">
    <field type="Record Identifier"
        start="1"
        end="1"
        justification="Left"
        pad="Zero">
    <field type="Customer Number"
        start="2"
        end="10"
        justification="Left"
        pad="Blank">
    <field type="Payment Number"
        start="11"
        end="20"
        justification="Right"
        pad="Zero">
    <field type="Receipt Date"
        start="21"
        end="28"
        justification="Left"
        format="MMDDYYYY"
        pad="Blank">
    <field type="Currency"
        start="29"
        end="31"
        justification="Left"
        pad="Blank">
</transRecord>
<transRecord recordtype="Overflow Payment"
        identifier="9">
    <field type="Record Identifier"
        start="1"
        end="1"
        justification="Left"
        pad="Zero">
    <field type="Invoice 1"
        start="2"
        end="10"
        justification="Left"
        pad="Blank">
```

TABLE 5-continued

Exemplary transRecord Format Specification

```
        <field type="Amount Applied 1"
            start="11"
            end="20"
            justification="Right"
            pad="Zero">
        <field type="Invoice 2"
            start="21"
            end="29"
            justification="Left"
            pad="Blank">
        <field type="Amount Applied 2"
            start="30"
            end="49"
            justification="Right"
            pad="Zero">
</transRecord>
```

Figure 3:
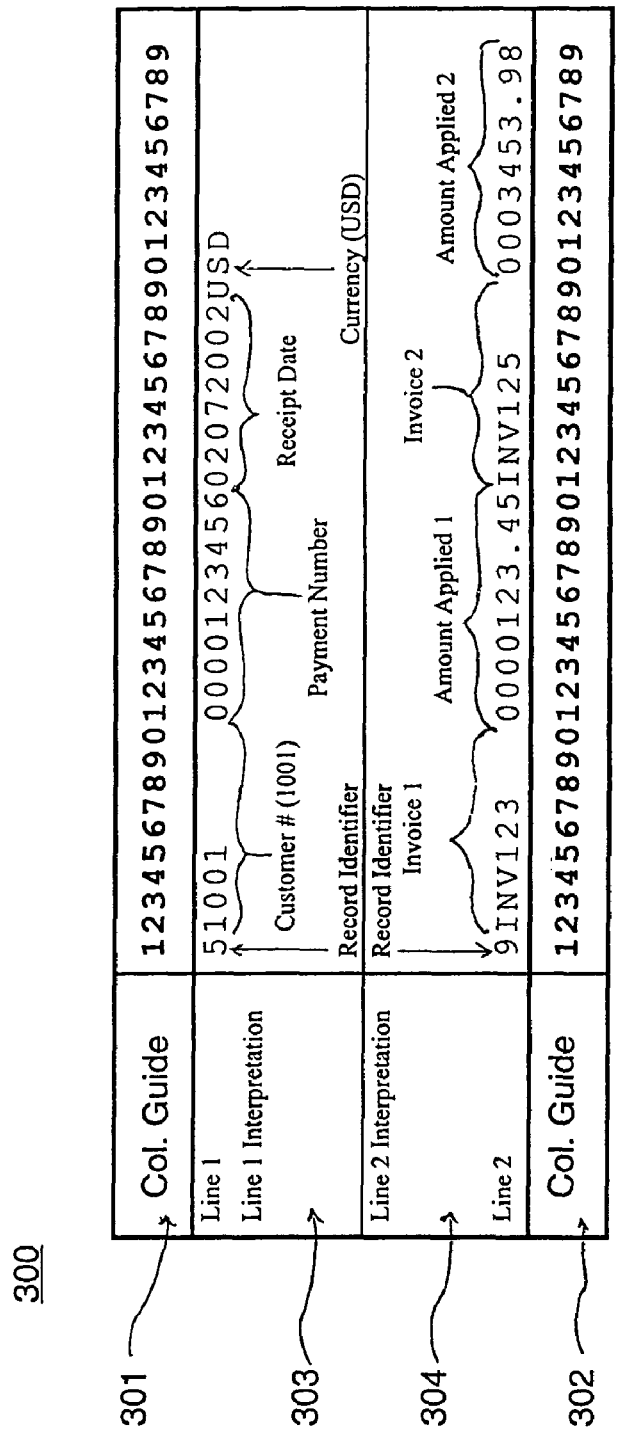
FIG. 3 illustrates an exemplary interpretation a matching program can make of valid lockbox lines, according to one embodiment.

A lockbox file (e.g., lockbox file 109; FIG. 1) comprises lockbox lines. With reference to FIG. 3, the interpretation a matching program makes of exemplary valid lockbox lines 300 is illustrated, according to one embodiment. As depicted in interpretation field 303, lockbox line 1, beneath column guide 301, comprises a record identifier '5', a customer number '1001', a payment number '0000123456', and a receipt date '02072002', and denotes 'USD' (United States Dollars) as the currency.

As depicted in interpretation field 304, lockbox line 2, above column guide 302, comprises a record identifier '9', a first invoice identity 'INV123' and a corresponding first amount applied '0000123.45', and a second invoice identity 'INV125' and corresponding second amount applied '0003453.98'. Upon interpreting the lockbox lines 300, the matching program weighs the corresponding parameters reflected therein according to the matching rules and transaction information (e.g., matching rules 102, staged transaction information 107; FIG. 1) and scores them as possible matches of varying probability. In one embodiment, a matching process (e.g., process 500; FIG. 5) performed by the matching program can follow a scoring structure.

Exemplary Scoring Structure

Figure 4:
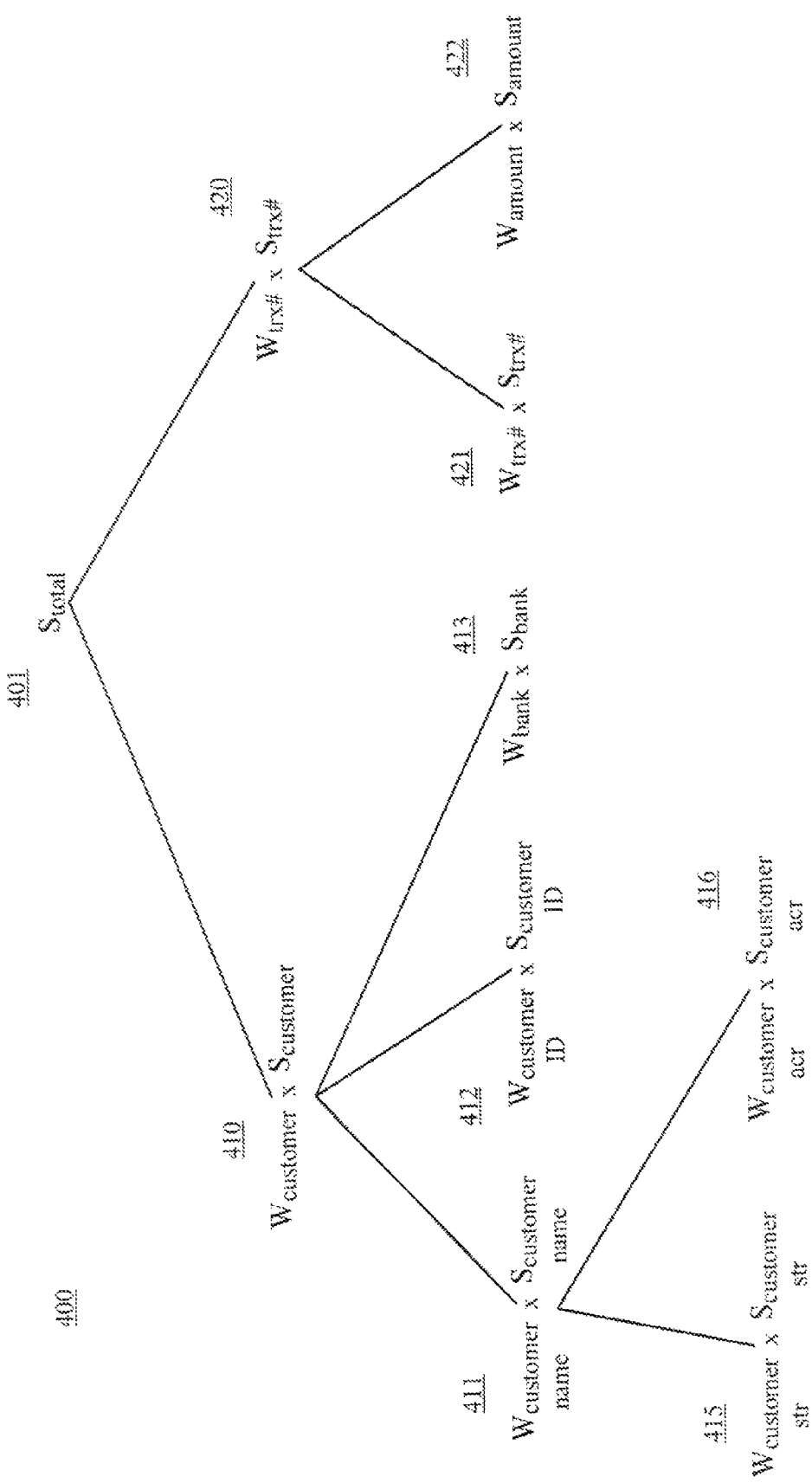
FIG. 4 depicts an exemplary scoring structure, which is used to calculate a weighted matching score according to one embodiment of the present invention.

FIG. 4 depicts an exemplary scoring structure 400, which is used to calculate a weighted matching score according to one embodiment of the present invention. The weighted matching score comprises the probability of a possible match being accurate and precise in order to seek the best possible (e.g., the most probable accurate and precise) match between a remittance and transactions in a database is computed.

In FIG. 4, a score value is denoted by 'S' and a weight is denoted by 'W'. Scores S correspond to probabilities of matching between a remittance and a transaction based on particular parameters, such as invoice identifying numbers, other invoice information, and corresponding customer information. In scoring structure 400, each score S comprises a percentage calculated out of a maximum possible 100% for each particular parameter being scored.

FIG. 4 summarizes the components that comprise the total score $S_{total}$ 401. At the highest level, the matching score for a transaction is a weighted average of a score based on transaction attributes and a score based on customer attributes.

Weights W correspond to values for the significance of certain factors taken into account in scoring. These values are determined by a user and entered by a GUI providing matching rule setup screens to generate a matching rule (e.g., GUI matching rule setup screens 101, matching rules 102; FIG. 1).

The significance a user assigns to determine a corresponding weight in generating a matching rule can be based on subjective and/or objective business considerations including but not limited to historical data and information specific to particular customers and groups of customers. The weights that are used to compute each score at each node of the tree are constrained in one embodiment to add up to 100% and reflect business rules prescribed by the user. At each node of scoring structure 400, weights W sum to 100%:

$$W_{customer} + W_{trx} = 100\%$$

$$W_{customername} + W_{customerID} + W_{bank} = 100\%$$

$$W_{trx\#} + W_{amount} = 100\%$$

$$W_{customerstr} + W_{customeracr} = 100\%$$

The weights W for each parameter are multiplied by the corresponding score S for that particular parameter to generate a weighted score 'W×S' for that parameter.

In scoring structure 400, a total score 401 comprises a weighted customer score 410 combined with a weighted transaction score 420. Weighted customer score 410 comprises a combining of a weighted customer name score 411, a weighted customer identity score 412, and a weighted bank score 413. Weighted customer name score 411 comprises a combining of a weighted customer-associated acronym score 416 with a weighted customer string score 415. Weighted transaction score 420 comprises a combining of a weighted transaction number score 421 and a weighted transaction amount score 422.

Exemplary Process for Computing Weighted Scores

FIG. 5 is a flowchart of an exemplary process 500 wherein weighted scores are computed, according to one embodiment of the present invention. The steps described herein can be performed as discussed below in somewhat greater detail. Further, the steps and sequence thereof comprising process 300 as described herein are for the purpose of illustrating and describing one exemplary method by which weighted scores can be calculated by which a remittance can be matched to a transaction.

These steps and their sequence are not to be construed as limiting. Other embodiments of the present invention are well suited to computing scores to match remittances to transactions using other steps and/or sequencing of steps. For example, in another embodiment, the computation of a weighted transaction score (e.g., step 512 herein) can be performed prior to computation of a weighted customer score (e.g., step 508 herein).

Process 500 begins with step 501 wherein a weighted customer string score is computed (e.g., calculated). In step 502, a weighted customer acronym score is computed. In step 503, a customer name score is computed. In step 504, a weighted customer name score is computed.

In step 505, a weighted bank score is computed. In step 506, a weighted customer identity score is computed. In step 507, a customer score is computed. In step 508, a weighted customer score is computed.

In step 509, a weighted transaction number score is computed. In step 510, a weighted transaction amount score is computed. In step 511, a transaction number score is computed. In step 512, a weighted transaction number score is computed. In step 513, score components treated as strings are scored using, in one embodiment, a Levenshtein and Longest common substring fuzzy scoring heuristic. In step 514, a total score is computed.

In step 515, it is determined whether a score (e.g., a total score) falls below a match threshold, which can be set by a user. If a score falls below a match threshold, then in step 516, an attempt is made to match the remittance against multiple invoices. In one embodiment, matching the remittance against multiple transaction invoices is performed using a heuristic wherein the sum of the invoices is matched as closely as possible to the amount of the remittance. Upon handling the exceptions (or if no exception is encountered), process 500 is complete.

Exemplary Score Structure Fields Illustrate Computation of Parameters

Considering the exemplary scoring structure 400 introduced above (FIG. 4), the steps comprising a process for computing scores (e.g., process 500; FIG. 5) can be explained further.

Exemplary Customer Score Computation

Figure 6:
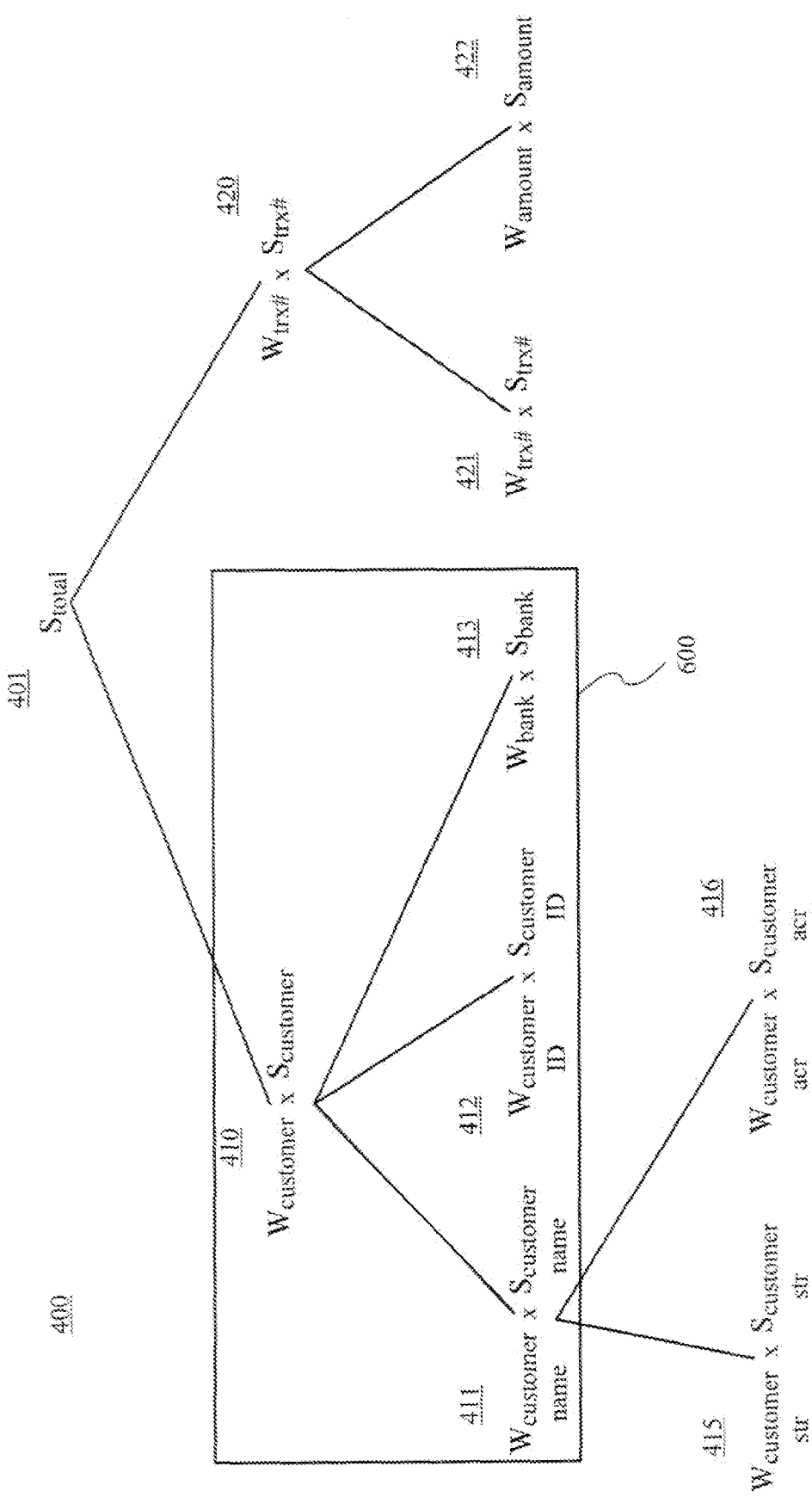
FIG. 6 depicts a determination of a customer score, according to one embodiment of the present invention.

Referring to FIG. 6, field 600 illustrates that the customer score, $S_{customer}$, is computed as a weighted average over 100% from the following components: the Customer Name Score and Weight ($S_{customername}$ and $W_{customername}$ herein, respectively); the Customer Identifying Number Score and Weight ($S_{customer\#}$ and $W_{customer\#}$ herein, respectively); and the Customer Bank Account Score and Weight ($S_{bank}$ and $W_{bank}$ herein, respectively). As discussed above, the score is a weighted average over 100%; thus the weights sum up to 100%.

The customer name score, $S_{customername}$ is in turn computed as a weighted average over 100% from the following components: the Customer Name's String Score and Weight ($S_{customerstr}$ and $W_{customerstr}$ herein, respectively); and the Customer Name's Acronym Score and Weight ($S_{customeracr}$ and $W_{customeracr}$ in this document, respectively). As the score is a weighted average over 100%, the weights add up to 100%.

Exemplary Transaction Score Computation

Figure 7:
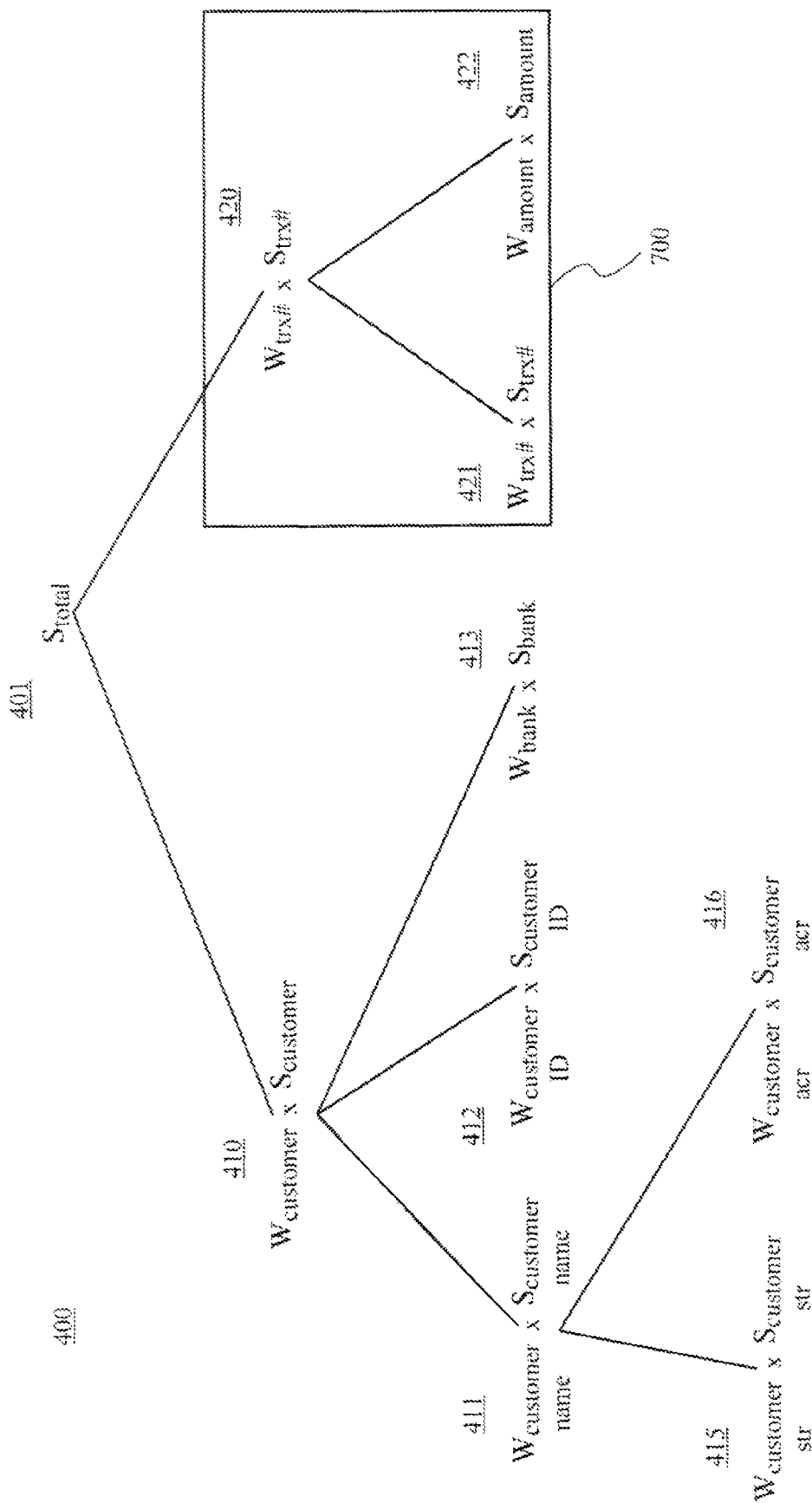
FIG. 7 depicts a determination of a transaction score, according to one embodiment of the present invention.

Referring to FIG. 7, field 700 illustrates that the transaction score, $S_{trx}$, is computed as a weighted average over 100% from the following components: the Transaction Identifying Number Score and Weight ($S_{trx\#}$ and $W_{trx\#}$ herein, respectively); and the Transaction Amount Score and Weight ($S_{amount}$ and $W_{amount}$ herein, respectively). As the score is a weighted average over 100%, the weights sum up to 100%. The Transaction Identifying Number Score is computed based on relevance factors provided by the user. The matching program allows users to place a different weight on closed transactions versus open transactions and other such factors.

Exemplary Customer Identifying Number Score Computation

Depending on the practice of the deploying company's (e.g., a business entity that deploys an embodiment of the present invention for use in matching remittances to transactions) business, the Customer Identifying Number can correspond to either the customer account number or the customer number. In one embodiment, the process scores on the customer number. In another embodiment, the process scores on the customer account number. Yet another embodiment scores using both numbers.

Figure 8:
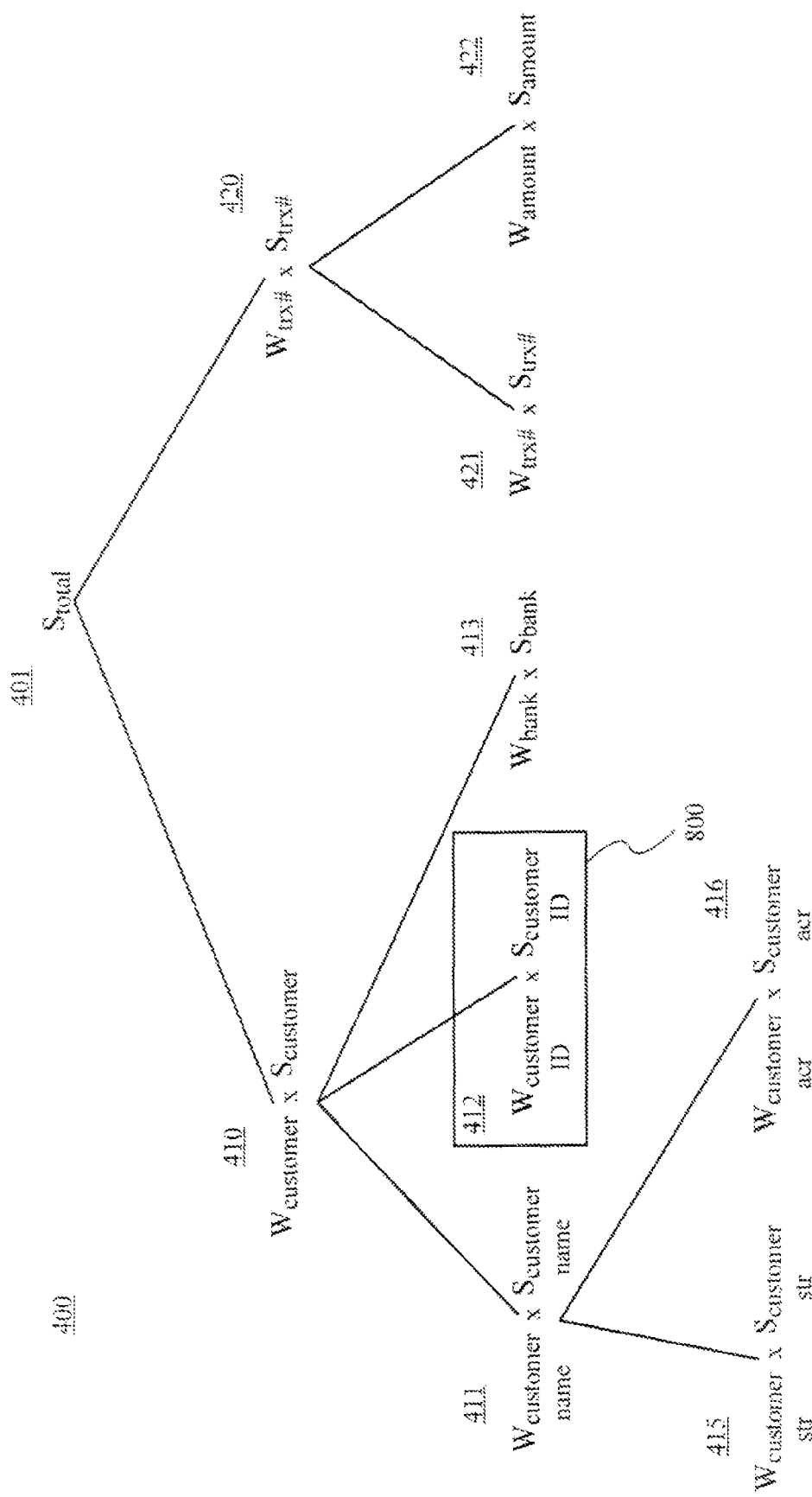
FIG. 8 depicts a determination of a customer identifying score, according to one embodiment of the present invention.

Referring to FIG. 8, field 800 illustrates that, in order to determine the Customer Identifying Number score ($S_{customer\#}$), the matching program evaluates the match score between the customer identifying number provided by the customer on their remittance and the customer account number and the customer number. Both of these scores are multiplied by a user-set corresponding relevance factor. A higher relevance factor for the customer account number or customer number can indicate that the given identifying number is more likely to be used when the customer is identifying themselves. The Customer Identifying Number score ($S_{customer\#}$) used in one embodiment to further score the transaction comprises the higher of these two scores. In another embodiment, $S_{customerID}$ comprises a weighted average of both of these scores.

Exemplary Customer Name Score Computation

Figure 9:
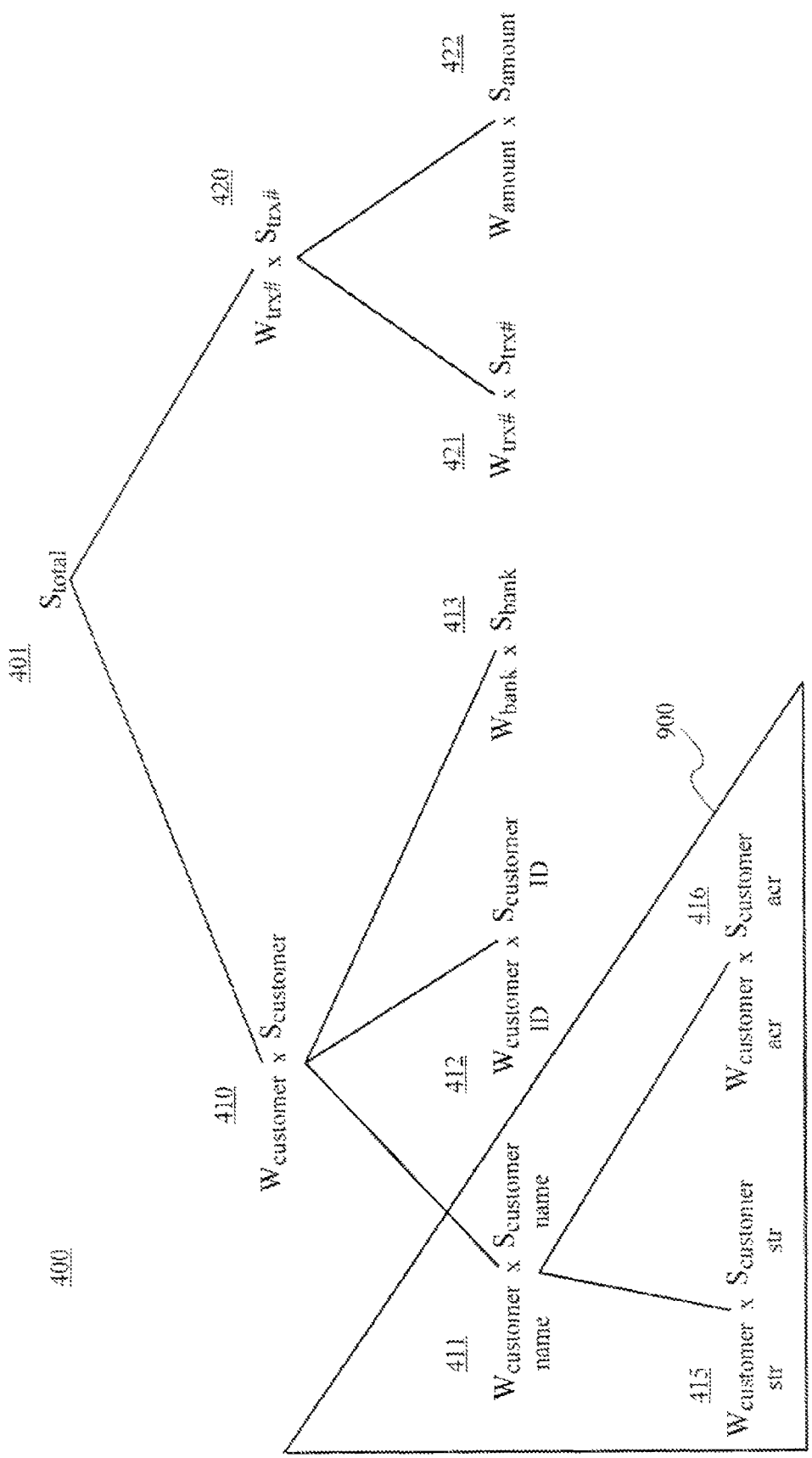
FIG. 9 depicts a determination of a customer name score, according to one embodiment of the present invention.

Referring to FIG. 9, field 900 illustrates that the customer name score $S_{customername}$ is comprised of the following two components: the weighted score of the string match between the name of the customer associated with the transaction and the customer on the remittance ($S_{customerstr}$); and the weighted score of the string match between the acronyms of the customer associated with the transaction and the customer on the remittance ($S_{customeracr}$). The Customer Name score, $S_{customername}$, is computed as a weighted average over 100% from these two components. As the score is a weighted average over 100%, the weights provided add up to 100%.

Exemplary Bank Score Computation

Figure 10:
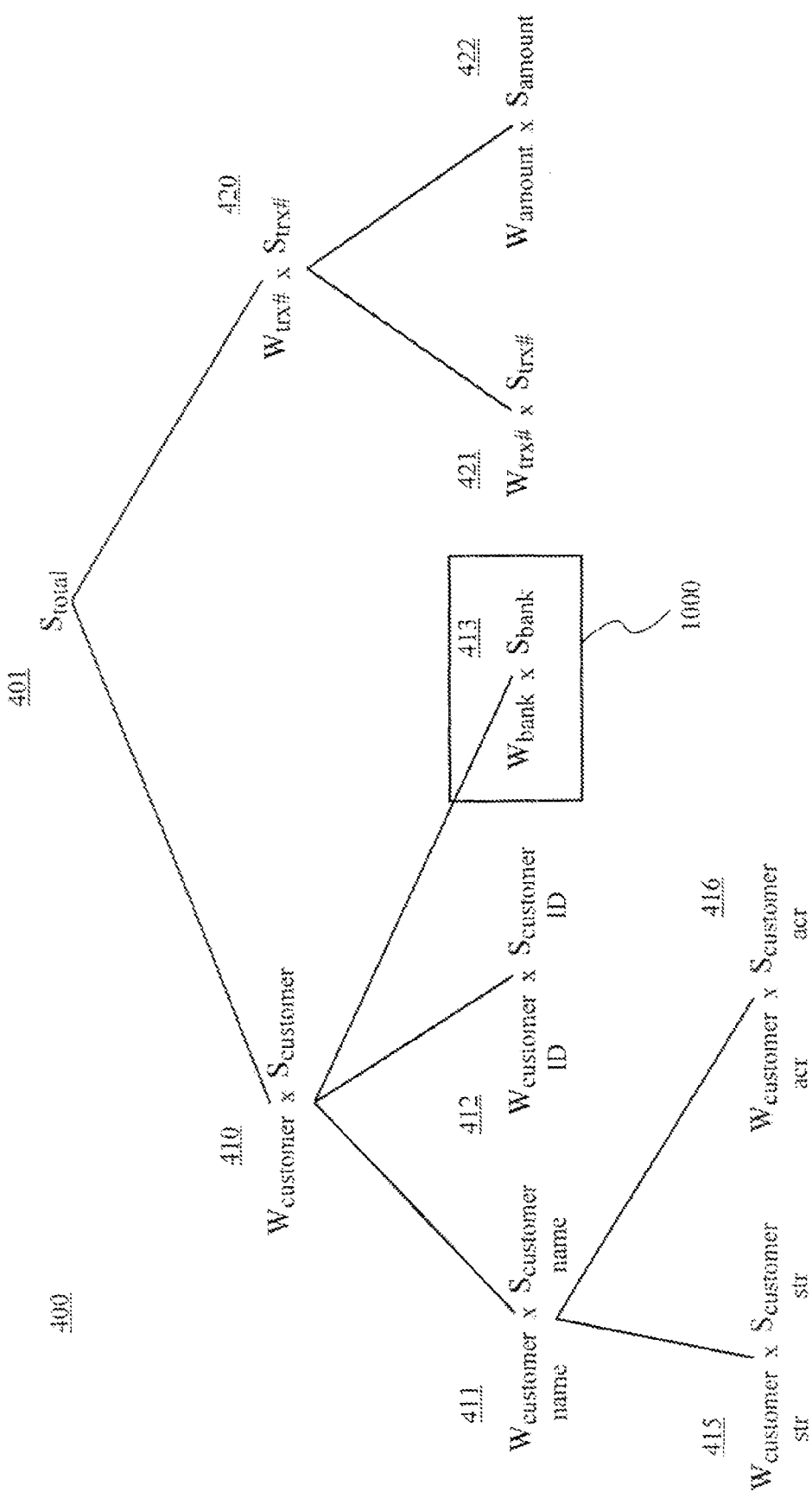
FIG. 10 depicts a determination of a bank score, according to one embodiment of the present invention.

Referring to FIG. 10, field 1000 illustrates a bank score computation. In order to determine the Bank score ($S_{bank}$), the matching program uses both the Transit Routing Number and the Account Number provided in the lockbox file. The matching program evaluates the match score between the concatenation of the Transit Routing Number and the Account Number provided by the customer on their remittance and the concatenation of the Customer Bank Number and Customer Bank Account database fields.

Exemplary Transaction Identifying Number Score Computation

Figure 11:
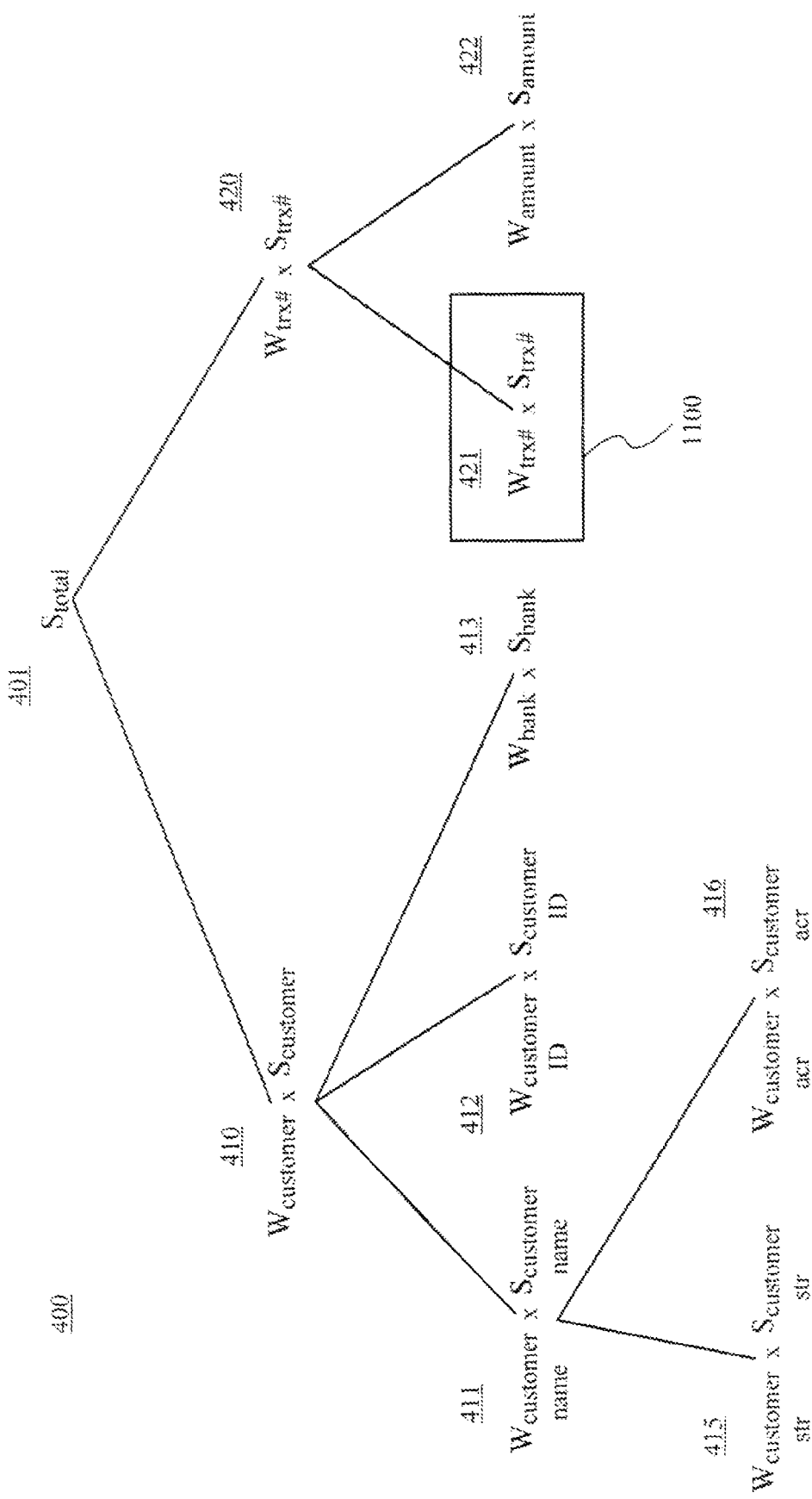
FIG. 11 depicts a determination of a transaction number score, according to one embodiment of the present invention.

Referring to FIG. 11, field 1100 illustrates a transaction identifying number score computation. Customers typically identify the transaction that they want to pay with their remittance with an identifying number for the transaction. Depending on the practice of the deploying company's business, this number could correspond to one of several numbers that can be used to identify the transaction, such as a transaction number or a bill of lading number.

In order to determine the Transaction Identifying Number score ($S_{trx\#}$), the Matching Routine evaluates the match score between the identifying number for the targeted transaction provided by the customer on their remittance and each of the following numbers on the transaction:

Transaction Number;

Purchase Order Number;

Transaction Reference;

Bill of Lading Number;

Sales Order Number; and

Transaction Header External System reference number. These are reference numbers provided by an application such as a non-receivables application in a transaction flexfield (or similarly functioning field or other feature therein) to help identify a transaction. In one embodiment, the following external system reference numbers are supported:

Projects application project number;

Projects application draft invoice number;

Projects application agreement number;

Transaction line external system reference number. These are reference numbers provided by a non-receivables application in its transaction line flexfield to help identify a transaction.

One embodiment supports external system reference numbers such as a Contracts application contract number, a Service application service order number, and a Projects application project number. In addition, to handle installments, in one embodiment the matching routine can also score the following remittance against other transaction information. For instance, where the Installment Number is provided separately in the remittance, the concatenation of the identifying number on the remittance followed by a dash ("-") and by the installment number on the remittance are compared against the transaction number followed by a dash and by the payment schedule terms sequence number. Where the installment number is not so provided, the identifying number on the remittance is compared against the transaction number followed by a dash and by the payment schedule terms sequence number.

The score obtained from matching the remittance identifying number against each of these transaction numbers is multiplied by the corresponding relevance factor that the user has set up. A higher relevance factor indicates that a given identifying number has more significance when trying to match a remittance to a transaction. In one embodiment, the Transaction Identifying Number score ($S_{trx\#}$) that is used to further score the transaction will be the highest relevance-weighted score among all of the transaction number scores.

Exemplary Transaction Amount Score Computation

Figure 12:
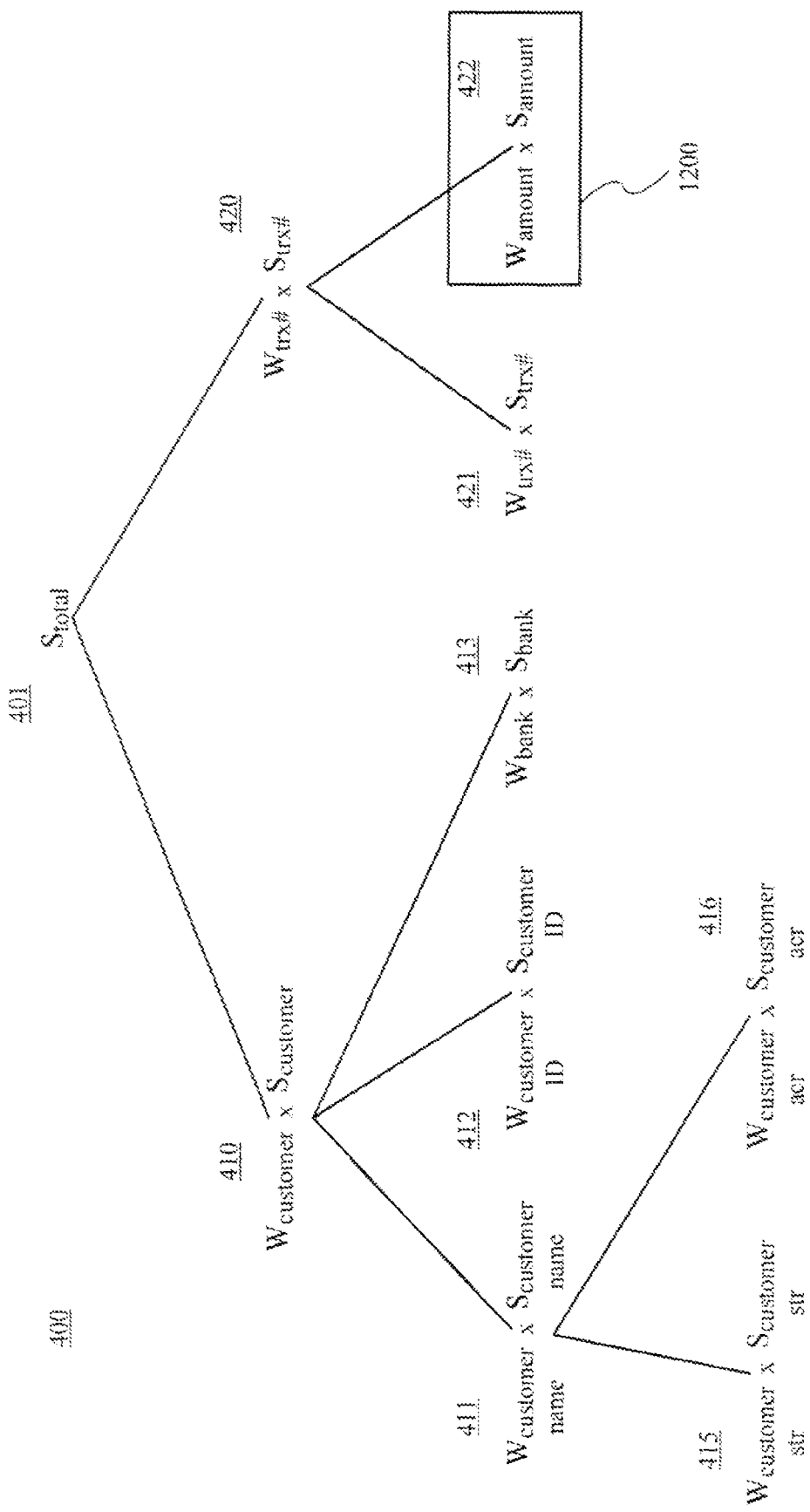
FIG. 12 depicts a determination of a transaction amount score, according to one embodiment of the present invention.

Referring to FIG. 12, field 1200 illustrates a transaction amount score computation. In one embodiment, the amount score for a transaction ($S_{amount}$) is derived by dividing the smaller of the amount on the transaction being considered and the amount of the remittance being matched by the larger of the two amounts:

$$S_{undiscounted} = \frac{\min(Amt_{transaction}, Amt_{remittance})}{\max(Amt_{transaction}, Amt_{remittance})} \quad \text{Formula 1}$$

In one embodiment, this computation is modified such that discounts are taken into consideration when scoring the amount match. In field 1200, whether the discount conditions have been met is not considered in scoring such matches. In the present embodiment, the matching routine match remittances to invoices in instances where customers incorrectly believe that they have met the discount conditions and they attempt to pay the discounted amount.

If there is a discount for the payment terms associated with the particular payment schedule matched against the remittance, the matching routine derives a discounted amount score by dividing the smaller of the discounted amount on the transaction and the amount of the remittance being matched by the larger of the two amounts:

$$S_{discounted} = \frac{\min(Amt_{transaction} \times (1 - \text{discount }\%), Amt_{remittance})}{\max(Amt_{transaction} \times (1 - \text{discount }\%), Amt_{remittance})} \quad \text{Formula 2}$$

The amount score is then be returned as the maximum of the undiscounted and discounted scores.

The scores for the following score components are treated as strings:

Customer Name ($S_{customerstr}$), which are scored using Levenshtein and Longest common substring fuzzy-scoring heuristics:

Customer Bank and Bank Account ($S_{bank}$, also the same as the MICR number);
Transaction Number;
Customer Number;
Customer Account Number;
Purchase Order Number;
Transaction Reference;
Bill of Lading Number;
Sales Order Number;
Transaction Header External System reference number;
Transaction Line External System reference number.

The Levenshtein and Longest common substring fuzzy-scoring heuristics comprise two different methods of evaluating the similarity between two strings. The Levenshtein process produces a matrix of the hamming distances between two strings. One embodiment reuses this matrix to efficiently compute the Largest Common Substring score in a reduced computation time for the Largest Common Substring score. This combines the Levenshtein and Largest Common Substring heuristics to get a more efficient implementation than what is possible if both heuristics are run independently.

The total score, $S_{total}$, is computed as a weighted average over 100% from the following components:

The Customer Score and Weight ($S_{customer}$ and $W_{customer}$ herein, respectively); and The Transaction Score and Weight ($S_{invoice}$ and $W_{invoice}$ herein, respectively).

As the score is a weighted average over 100%, the weights sum up to 100%. The formula for computing the total score given all of the aforementioned score is given by Formula 3 below.

$$S_{total} = W_{customer} \underbrace{\left( W_{customername} \underbrace{(W_{customerstr} \times S_{customerstr} + W_{customeracr} \times S_{customeracr})}_{S_{customername}} + W_{customer\#} S_{customer\#} + W_{bank} S_{bank} \right)}_{S_{customer}} + W_{trx}(W_{amount} S_{amount} + W_{trx\#} S_{trx\#}) \quad \text{Formula 3}$$

In one embodiment, the matching program can also match against open deposits transactions and against closed transactions that were credit memo'ed over a given period of time. In one embodiment, the matching routine allows users to place a different weight on closed transactions versus open transactions. In doing so, the matching program accepts a closed transaction penalty to allow users to adjust the scores of transactions if they have been closed. This factor is between 0 and 100% and penalizes the total score of the invoice ($S_{total}$) with a penalty P by multiplying the score by (1–P). In one embodiment, one payment is matched to a transaction. Another embodiment matches multiple payments to a transaction.

In summary, an embodiment of the present invention provides a method and system for matching remittances to transactions. The method for matching remittances to transactions disclosed herein uses a processing paradigm that is not complicated to maintain and fosters the use of logic based on the summarization of payments. The method disclosed herein also matches remittances to particular transactions with relaxed sensitivity to where identifying markers may be placed on a remittance and is resistant to typographical data entry errors. Further, the method disclosed herein is flexible with regards to handling various kinds of information that can result in accurate, precise matching without discarding or overlooking such information.

In one embodiment, a computer implemented method matches a remittance to a transaction by receiving remittance lines, transaction information, and matching rules wherein the matching rules assign a weight to a parameter considered in the matching, computing a weighted matching score corresponding to the parameter based upon that weight wherein the matching score corresponds to a probability of an accurate and precise match between the remittance and the transaction, and generating a match recommendation based on that weighted matching score.

One embodiment of the present invention provides significant reduction in miss rate (e.g., failing to accurately and precisely match a remittance to a correct, corresponding transaction). Advantageously, use of the present embodiment by a business entity can provide a business entity user with a significant savings in what must conventionally be expended on research costs associated with unapplied receipts (e.g., research conducted by trained personnel to correlate unmatched/mismatched receipts to their correct corresponding transactions). Further financial advantages can accrue to the concomitant ability to more quickly apply remittances received, once they are matched to their respective transactions. Thus, an embodiment of the present invention promotes commercial efficiency. The present embodiment provides a novel process and combination of tools which promote matching remittances to transactions in a useful, intuitive way.

An embodiment of the present invention, a method for matching remittances based on weighted scoring and fuzzy logic, is thus described. While the present invention has been described in particular embodiments, the present invention should not be construed as limited by such embodiments, but rather construed according to the following claims and their equivalents.

What is claimed is:

1. A computer based system for matching a remittance to a transaction, said system comprising:
   a storage memory having sets of instructions stored thereon; and
   a computer processor coupled with the storage memory, the computer processor configured to execute the sets of instructions, which cause the computer processor to perform the following method:
   accessing, by a matching program, remittance lines of said remittance, a transaction information, and a matching rule, wherein said matching rule assigns a weight to a plurality of parameters considered in said matching program;
   determining, by said matching program, for each parameter of the plurality of parameters, a score for a match between the remittance and the transaction for the parameter, wherein the score corresponds to a probability of an accurate match between the remittance and the transaction for the parameter determining;
   using the matching rule to assign a weight to each of the parameters of the plurality of parameters;
   computing a weighted matching score corresponding to a probability of an accurate match between said remittance and said transaction;
   for each parameter of the plurality of parameters, determining that the weighted matching score is above a global matching scoring threshold;
   in response to the weighted matching score being above the global matching score threshold, generating, using the assigned weight and the score for the parameter a match recommendation based on said weighted matching score;
   implementing a graphical user interface operating with said matching program and comprising an interactive display for allowing a user input;
   generating, at said graphical user interface, said matching rules, wherein each matching rule organizes a set of parameters into a tree structure according to significance of each of the parameters;
   implementing a data staging program operating with said matching program;
   accessing a database and extracting a relevant transaction information form the database;
   staging said relevant transaction information for use by said matching program; and
   providing said relevant transaction information to said matching program; and a post match handler for handling said match recommendation.

2. The System as recited in claim 1, wherein the matching program is further configured for comparing said remittance against a plurality of electronic invoices.

3. The System as recited in claim 2, wherein said comparing comprises associating a sum of said plurality of electronic invoices closely to an amount corresponding to said remittance.

4. The System as recited in claim 3 wherein said associating is performed by a process comprising a Knapsack heuristic.

5. The System as recited in claim 1, wherein said remittance lines comprise a lockbox file.

6. The System as recited in claim 1, wherein the matching program is further configured for calculating a weighted customer score, calculating a weighted transaction score, and determining a total weighted matching score based on said weighted customer score and said weighted transaction score.

7. The System as recited in claim 1, wherein said determining a total match score comprises scoring strings and numbers.

8. The System as recited in claim 7, wherein said scoring strings and numbers is performed by a process comprising a Levenshtein and Longest common substring fuzzy scoring heuristic.

9. The System as recited in claim 6, wherein said calculating a weighted transaction score comprises:
- calculating a weighted transaction number score;
- calculating a weighted transaction amount score; and
- determining said weighted transaction score based on said weighted transaction number score and said weighted transaction amount score.

10. The System as recited in claim 6, wherein said calculating a weighted customer score comprises:
- calculating a weighted customer name score;
- calculating a weighted customer identity score;
- calculating a weighted bank score; and
- determining said weighted customer score based on said weighted customer name score, said weighted customer identity score, and said weighted bank score.

11. The System as recited in claim 10, wherein said calculating a weighted customer name score comprises:
- calculating a weighted customer string score;
- calculating a weighted customer acronym score; and
- determining said weighted customer name score based on said weighted customer string score and said weighted customer acronym score.

12. The System as recited in claim 1, further comprising:
- sending said match recommendation to a receipt application program interface;
- assigning an informative header to a remittance for use by a receipt application;
- where said match recommendation comprises an unmatched remittance, sending said match recommendation to an unmatched remittance notification initiator; and
- initiating a workflow notification corresponding to said unmatched remittance.

13. The system as recited in claim 1, wherein the computer processor is further configured to execute the sets of instructions, which cause the computer processor to perform the following method:
- implementing a receipt application program interface operating with said post match handler for providing said match recommendation to a receipt application; and
- implementing a notification initiator operating with said post match handler for initiating a notification wherein said notification comprises a report that a match failed between said remittance and said transaction.

14. A computer usable medium having stored therein a computer readable program code that, when executed, causes a computer system to execute a method of matching a remittance to a transaction, the program code including instructions that cause a processor of the computer system to perform the following tasks:
- accessing remittance lines, transaction information, and a matching rule that assigns a weight to a plurality of parameters considered in said matching, wherein the matching rule organizes the parameters into a tree structure according to significance of each of the parameters;
- for each parameter of the plurality of parameters, determining a score for a match between the remittance and the transaction for the parameter, wherein the score corresponds to a probability of an accurate match between the remittance and the transaction for the parameter;
- determining, using the matching rule, a weight assigned to each of the parameters of the plurality of parameters;
- computing a weighted matching score corresponding to a probability of an accurate match between said remittance and said transaction, wherein the weighted matching score is computed based upon, for each parameter of the plurality of parameters, the assigned weight and the score for the parameter;
- determining that the weighted matching score is above a global matching scoring threshold; and
- in response to the weighted matching score being above the global matching score threshold, generating a match recommendation based on said weighted matching score.

15. The computer usable medium as recited in claim 14 wherein the program code further comprises instructions that cause a processor of the computer system to perform the following tasks:
- comparing said remittance against a plurality of invoices.

16. The computer usable medium as recited in claim 15 wherein said comparing comprises associating a sum of said plurality of invoices closely to an amount corresponding to said remittance.

17. The computer usable medium as recited in claim 16 wherein said associating is performed by a process comprising a Knapsack heuristic.

18. The computer usable medium as recited in claim 14 wherein said remittance lines comprise a lockbox file.

19. The computer usable medium as recited in claim 14, further comprising:
- calculating a weighted customer score;
- calculating a weighted transaction score; and
- determining a weighted total match score based on said weighted customer score and said weighted transaction score.

20. The computer usable medium as recited in claim 19 wherein said determining a total match score is further based on scoring strings and numbers.

21. The computer usable medium as recited in claim 20 wherein said scoring strings and numbers is performed by a process comprising a Levenshtein and Longest common substring fuzzy scoring heuristic.

22. The computer usable medium as recited in claim 19 wherein said calculating a weighted transaction score comprises:
- calculating a weighted transaction number score;
- calculating a weighted transaction amount score; and
- determining said weighted transaction score based on said weighted transaction number score and said weighted transaction amount score.

23. The computer usable medium as recited in claim 19 wherein said calculating a weighted customer score comprises:
- calculating a weighted customer name score;
- calculating a weighted customer identity score;
- calculating a weighted bank score; and
- determining said weighted customer score based on said weighted customer name score, said weighted customer identity score, and said weighted bank score.

24. The computer usable medium as recited in claim 23 wherein said calculating a weighted customer name score comprises:
- calculating a weighted customer string score;
- calculating a weighted customer acronym score; and
- determining said weighted customer name score based on said weighted customer string score and said weighted customer acronym score.

25. The computer usable medium as recited in claim 14 wherein said method further comprises handling said recommendations.

* * * * *

UNITED STATES PATENT AND TRADEMARK OFFICE
CERTIFICATE OF CORRECTION

| | |
|---|---|
| PATENT NO. | : 7,792,746 B2 |
| APPLICATION NO. | : 10/627027 |
| DATED | : September 7, 2010 |
| INVENTOR(S) | : Joseph L. Del Callar et al. |

It is certified that error appears in the above-identified patent and that said Letters Patent is hereby corrected as shown below:

On sheet 5 of 12, in Figure 5, Box No. 502, line 1, delete "C mpute" and insert -- Compute --, therefor.

In column 12, line 17, after "100%" insert -- . --.

Signed and Sealed this
Sixteenth Day of August, 2011

David J. Kappos
*Director of the United States Patent and Trademark Office*